(12) United States Patent
Watkins et al.

(10) Patent No.: US 6,190,478 B1
(45) Date of Patent: *Feb. 20, 2001

(54) METHOD OF MANUFACTURING TIRE INCLUDING GROOVES

(75) Inventors: David Robert Watkins, Sutton Coldfield; Michael Jackson; Paul Stephens, both of Birmingham, all of (GB)

(73) Assignee: Sumitomo Rubber Industries, Limited, Kobe (JP)

( * ) Notice: Under 35 U.S.C. 154(b), the term of this patent shall be extended for 0 days.

This patent is subject to a terminal disclaimer.

(21) Appl. No.: 09/164,773

(22) Filed: Oct. 1, 1998

(30) Foreign Application Priority Data

Oct. 3, 1997 (GB) .................................................. 9720915

(51) Int. Cl.⁷ .......................... B29D 30/00; B29D 30/68; B60C 11/113; B60C 117/00
(52) U.S. Cl. ................................... 156/110.1; 152/209.8; 152/209.17; 152/903; 152/904
(58) Field of Search ............................ 152/209.8, 209.9, 152/209.17, 209.18, 209.28, 903, 904, DIG. 3; D12/149, 151; 156/110.1

(56) References Cited

U.S. PATENT DOCUMENTS

| | | | |
|---|---|---|---|
| D. 340,893 | * 11/1993 | Kobayashi et al. | D12/147 |
| D. 340,899 | * 11/1993 | Kobayashi et al. | D12/151 |
| 2,154,290 | * 4/1939 | Snyder | 152/209.8 |
| 3,409,064 | * 11/1968 | Leonard | 152/209.17 |
| 3,645,313 | * 2/1972 | Roberts et al. | 152/209.17 |
| 3,705,613 | * 12/1972 | Verdier | 152/209.98 |
| 4,057,089 | * 11/1977 | Johannsen | 152/209.28 |
| 4,266,592 | * 5/1981 | Takigawa et al. | 152/209.17 |
| 4,984,616 | * 1/1991 | Shepter et al. | 152/904 |
| 5,027,876 | * 7/1991 | Chrobak et al. | 152/209.17 |
| 5,152,854 | * 10/1992 | Matsumoto | 152/209.28 |
| 5,714,026 | * 2/1998 | Wakabayashi et al. | 156/110.1 |
| 5,964,266 | * 10/1999 | Boiocchi et al. | 152/903 |

FOREIGN PATENT DOCUMENTS

| | | | |
|---|---|---|---|
| 3815829 | * | 12/1988 | (DE) . |
| 906836 | * | 4/1999 | (EP) . |
| 484176 | * | 9/1935 | (GB) . |
| 1-262204 | * | 10/1989 | (JP) . |
| 3-104709 | * | 5/1991 | (JP) . |

* cited by examiner

*Primary Examiner*—Steven D. Maki
(74) *Attorney, Agent, or Firm*—Birch, Stewart, Kolasch & Birch, LLP

(57) ABSTRACT

A tire for a vehicle having at least one wheel at each corner, the tire comprising a ground contacting tread extending axially between first and second edge regions and having tread grooves formed therein, wherein in the first axial edge region of the tread the tread grooves are aligned substantially in the tire circumferential direction and in the second axial edge region of the tread the grooves are aligned substantially in the tire axial direction and in a third axial region of the tread axially between the first and second edge regions the alignment of the grooves changes progressively from circumferential to axial.

3 Claims, 5 Drawing Sheets

US 6,190,478 B1

METHOD OF MANUFACTURING TIRE INCLUDING GROOVES

BACKGROUND OF THE INVENTION

This invention relates to tires for vehicles which generally have at least one wheel at each corner such as passenger cars, vans, trucks or buses.

In common with most other types of tires, in order for this tire to perform well under all conditions it is usual for the ground contacting tread region of the tire to be provided with relatively deep grooves in the surface.

In wet conditions such grooves assist in clearing water from the contact area between the tire tread and the road surface and thus help to retain steering control of the vehicle by preventing aquaplaning. In other conditions such as snow and ice or in off-road applications such grooves provide edges which assist in the transmission of traction forces.

However the provision of such grooves effectively weakens the tire tread and renders it more prone to wear. This occurs because such grooves divide the tread into discrete elements such as ribs and blocks which individually are more susceptible to deformation and movement in the tire/ground contact region due to the tractive forces transmitted therein resulting in abrasion of the rubber against the road surface.

In making the present invention, the inventors studied the alignment of the grooves in the tread of such tires and determined that it was possible to arrange these so as to minimize wear of the tread rubber.

SUMMARY OF THE INVENTION

Accordingly it is an object of the present invention to provide a tire for a four wheeled vehicle which is improved in tread wear.

According to one aspect of the present invention a tire for a vehicle having at least one wheel at each corner comprises a ground contacting tread extending axially between first and second edge regions and having tread grooves formed therein, wherein in the first axial edge region of the tread the tread grooves are aligned substantially in the tire circumferential direction and in the second axial edge region of the tread the grooves are aligned substantially in the tire axial direction and in a third axial region of the tread axially between the first and second edge regions the alignment of the grooves changes progressively from circumferential to axial.

According to another aspect the invention provides a tire mounted on a vehicle, the tire comprising a ground contacting tread extending between first and second axial edge regions and having tread grooves formed therein, wherein the first axial edge region of the tread the tread grooves are aligned substantially in the tire circumferential direction and in a second axial edge region of the tread the grooves are aligned substantially in the tire axial direction and in a third axial region of the tread axially between the first and second edge regions the alignment of the grooves changes progressively from circumferential to axial and the first axial edge region of the tire is disposed nearest to the vehicle longitudinal centerline.

According to yet another aspect the invention provides a method of determining the required tread groove angle to form the tread pattern of a tire for a four-wheeled vehicle to give optimum tread wear comprising at successive axial points across the tread from the center to the tread edge aligning the tread groove in the direction of the resultant force acting on the tread at that axial point when the point is in the tire/road contact region.

BRIEF DESCRIPTION OF THE DRAWINGS

Further aspects of the invention will become apparent from the following description by way of example only of embodiments of the invention in conjunction with the following drawings in which.

DETAILED DESCRIPTION OF THE DRAWINGS

Figure 1:
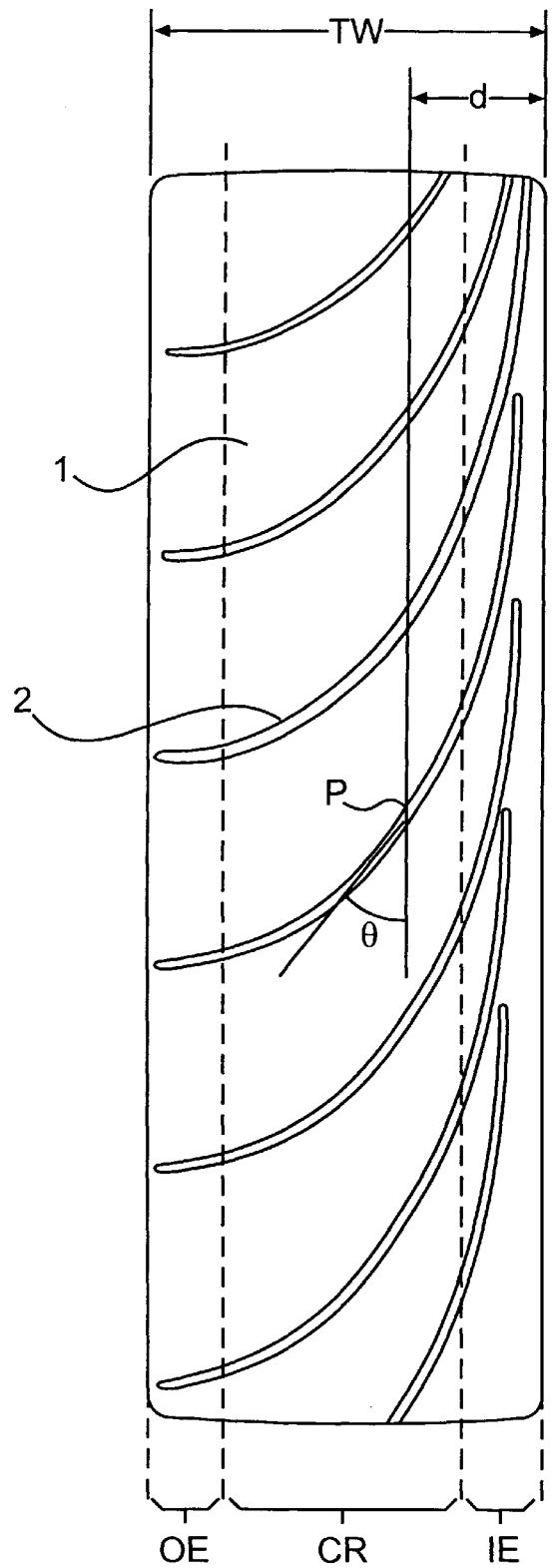
FIG. 1 shows a schematic view of a tire in accordance with the invention.

FIG. 1 shows a front view of a tire according to a first embodiment of the invention comprising a tire tread 1 having tread grooves 2 formed therein. The tread grooves 2 extend axially across the entire width of the tread between axial edge regions OE and IE through the central tread region CR. In the outer axial edge region OE of the tread the alignment of the grooves is substantially axial whereas in the inner axial edge region IE the grooves are aligned substantially in the tire circumferential direction.

In the central region CR of the tire between the outer and inner edge regions OE and IE respectively the alignment of the tread grooves 2 changes progressively from axial to circumferential as shown.

Thus to summarize the alignment of grooves according to the invention, the angle $\theta$ of the groove to the circumferential direction of the tire at any axial point or position P displaced by distance d from the tire inner edge IE increases with increasing d wherein $0° \leq \theta \leq 90°$ and $0 \leq d \leq$ tread width TW.

Thus in accordance with the present invention the tire is provided with tread grooves 2 having the configuration shown in FIG. 1. For the purposes of providing a generally optimized groove alignment such as depicted in FIG. 1, the inventors have found that a cosecant curve gives a configuration which reduces tread groove wear. The cosecant curve is implemented on the tire tread as y=cosecant (x) wherein y is the circumferential tire direction and x is the axial direction.

According to another aspect the invention provides the tire mounted on a vehicle. As shown in the schematic diagram of FIG. 2, the tire of FIG. 1 is mounted on the vehicle so that the tire inner edge region IE is closest to the vehicle longitudinal centerline represented by VCL.

Figure 2:
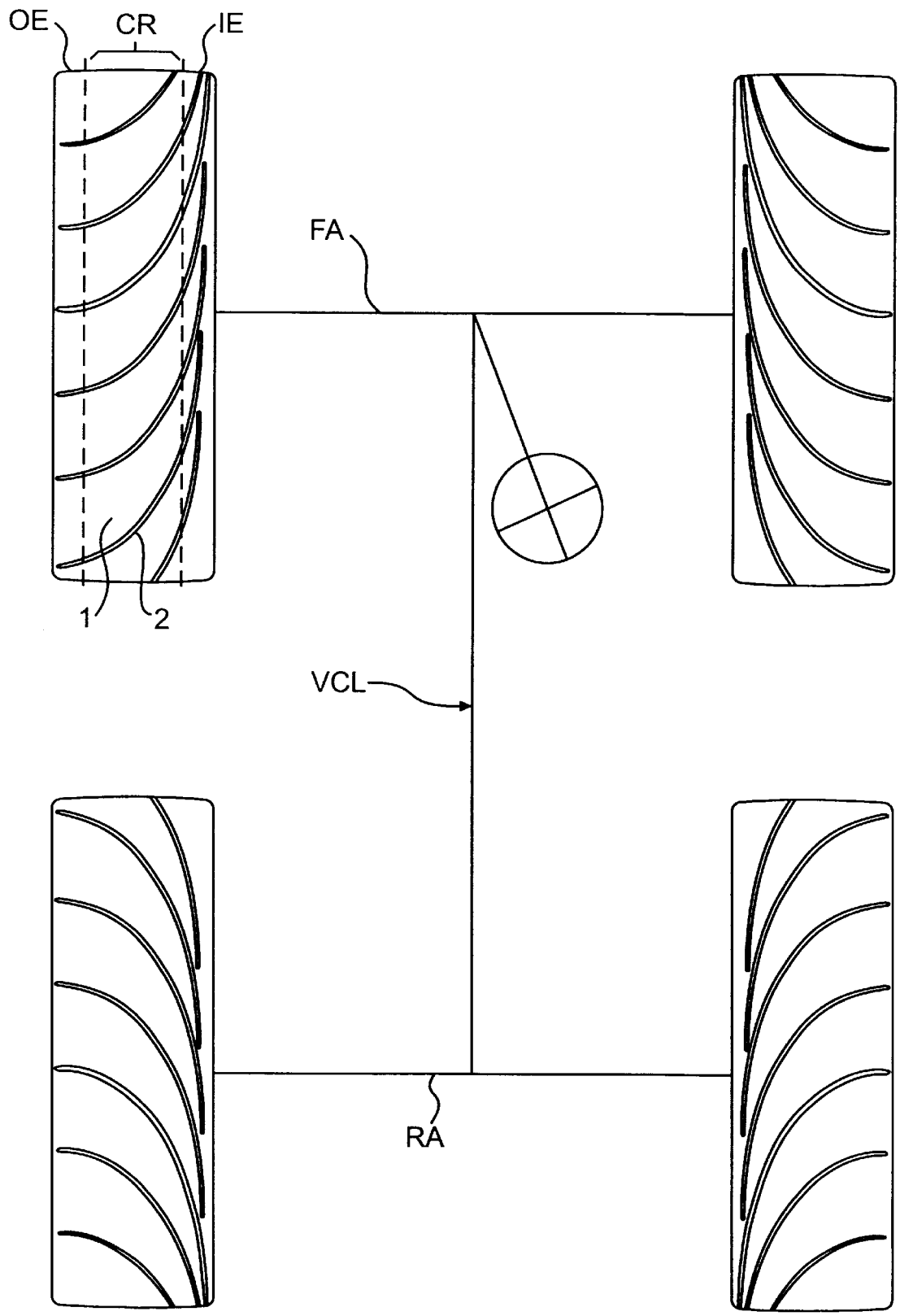
FIG. 2 shows a schematic plan view of the tire of FIG. 1 mounted on a vehicle in accordance with another aspect of the invention.

Thus it can be seen from FIG. 2 that in order to derive the optimum improved tread groove wear from the tire of FIG. 1, it is intended that the present tires be fitted as orientated pairs to the steerable front axle FA and the rear axle RA. The specific orientation shown in FIG. 2 wherein the front tire pair is orientated oppositely to the rear tire pair would be particularly suited to a rear wheel driven vehicle in which due to load transfer characteristics the acceleration forces act predominantly through the rear wheels whilst the braking forces act predominantly through the front wheels.

Figure 3:
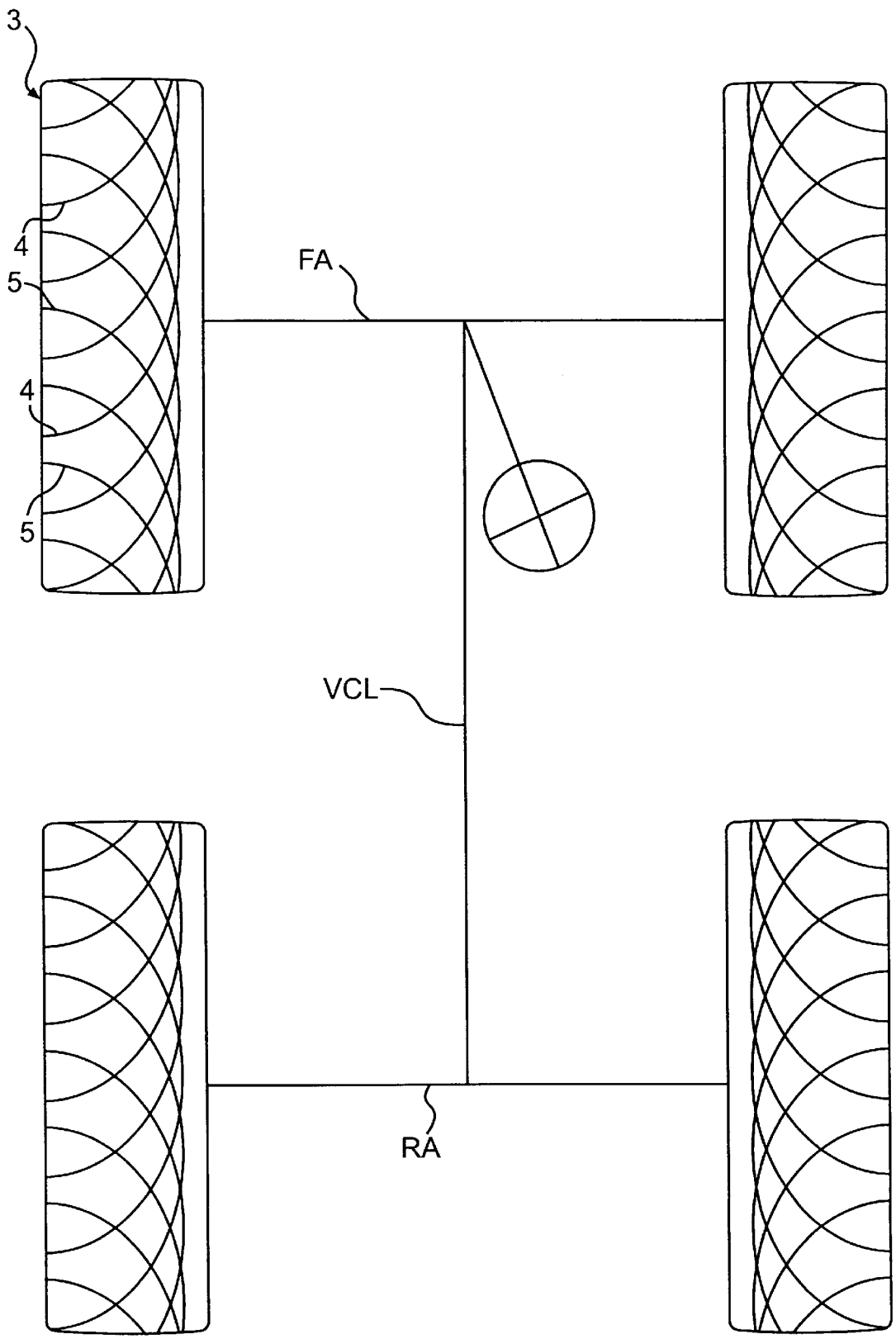
FIG. 3 shows a schematic plan view of another tire of the invention mounted on a vehicle.

In the case of other types of vehicle or where such directional tire fitment is undesirable, an alternative embodiment of the present invention shown in FIG. 3 may be employed. As can be seen in FIG. 3 the tire 3 has two patterns of tread grooves, one pattern of grooves 4 and another pattern of grooves 5 which curve in opposite circumferential direction as they progress axially inwardly. Whilst only the pattern of grooves 4 will have the optimum alignment for braking and the pattern of grooves 5 will have the optimum alignment for acceleration, overall the combination of grooves shown retain to a large degree the beneficial reduced tread wear attributable to the invention.

Figure 4:
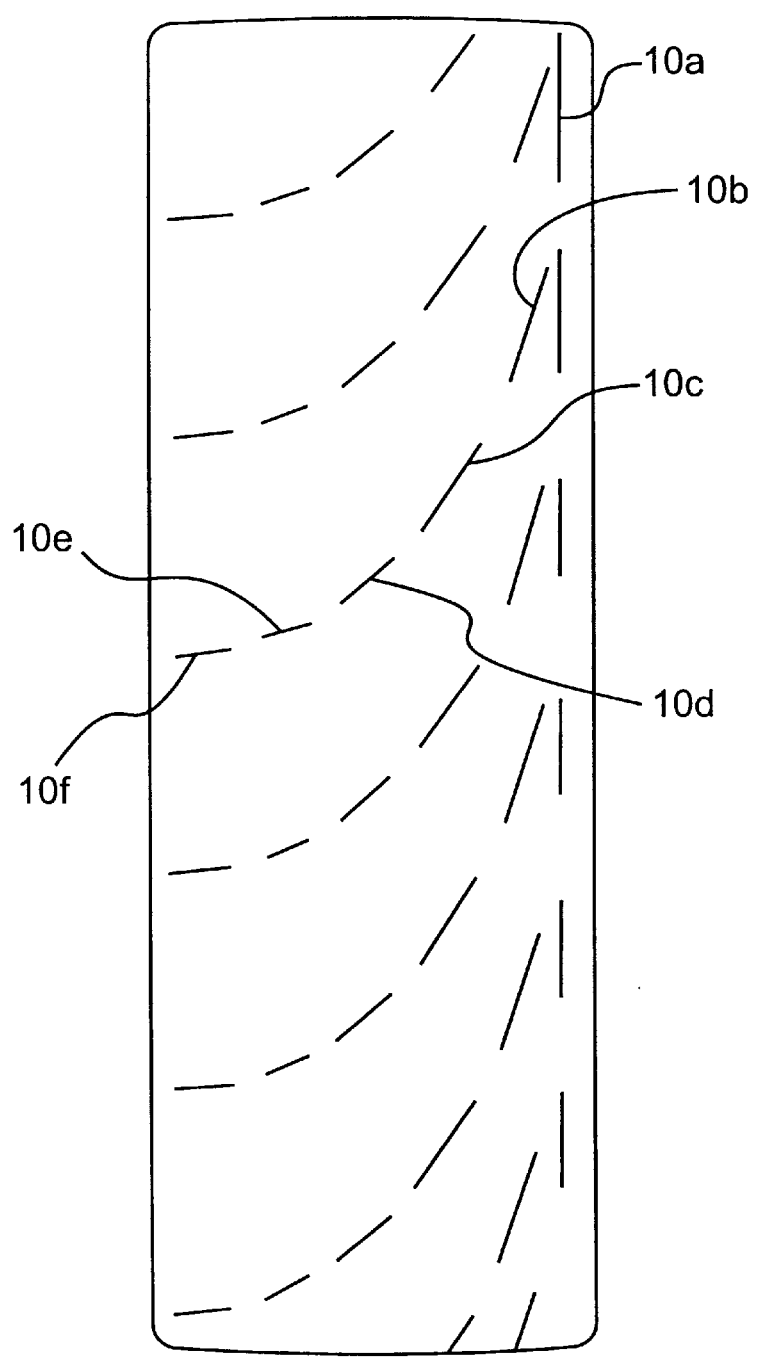
FIG. 4 is a schematic diagram showing discontinuous tread grooves in accordance with the invention.
Figure 5:
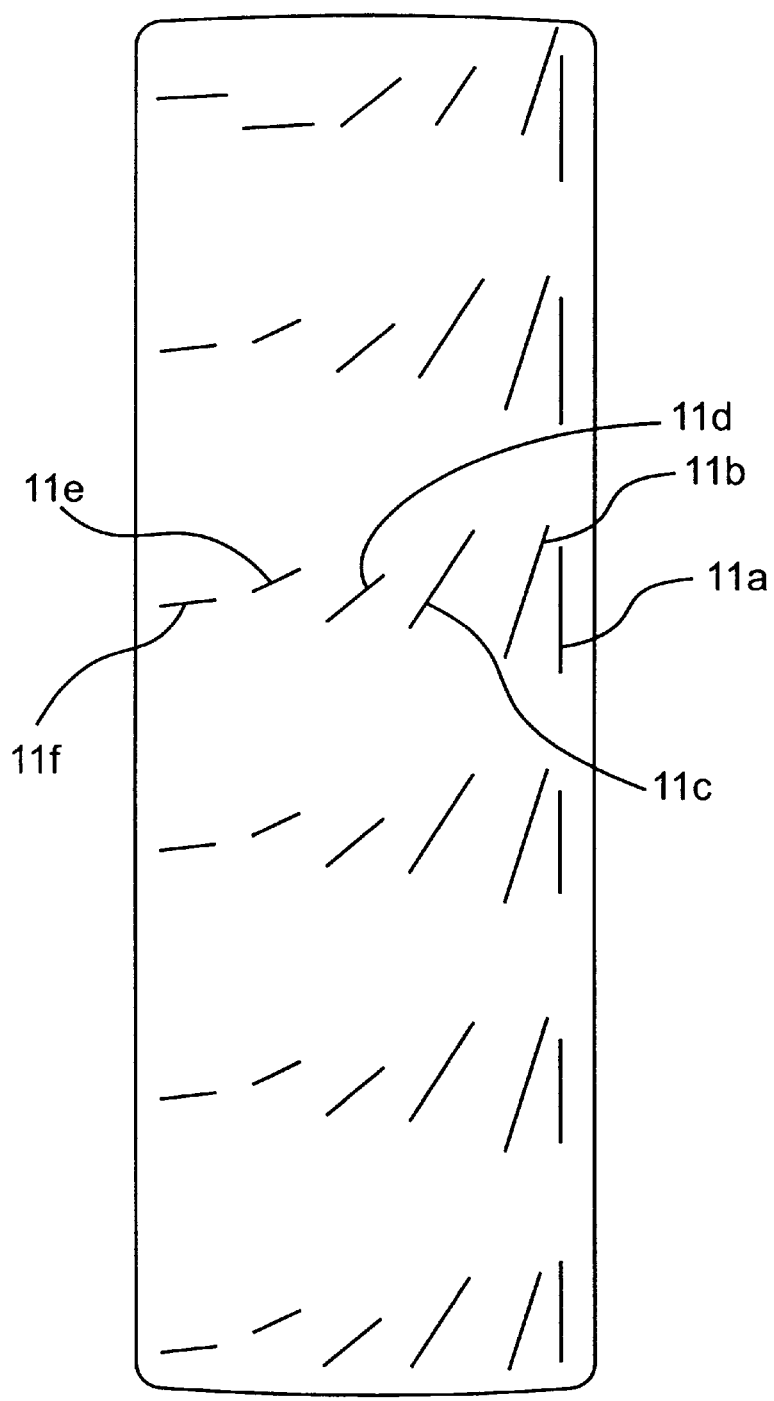
FIG. 5 is a schematic diagram showing another pattern of discontinuous tread grooves according to the invention.

Whilst the aforementioned tread grooves are shown and described as continuous across the axial width of the tread, they may be discontinuous in which event each groove section be it straight or curved is aligned according to the invention. Examples of discontinuous groove patterns are shown in the schematic diagrams FIG. 4 and FIG. 5. Thus these discontinuous patterns comprise individual groove sections 10a–10f and 11a–11f respectively. The tread may also comprise longitudinal tread grooves.

The invention also provides a method of determining the required tread groove angle or alignment to form the tread pattern having optimum, i.e. minimum, tread wear. This method comprises at successive axial points across the tread from one edge to the other edge aligning the tread groove in the same direction as the resultant typical slippage of the tread when the axial point concerned is within or at the center of the tread/road contact region.

Thus in accordance with the invention whilst there may be determined a groove alignment pattern which can reduce tread wear for each class or type of tire the optimum alignment pattern giving the maximum benefit will vary dependent on the manner of use of the tire, i.e. the type of driving of the vehicle, which ultimately determines the degree and direction of tread slippage.

This method may be implemented either by calculation or by practical determination.

For the method by calculation it has been found expedient to determine the direction of the resultant force acting on the tread at a particular axial point in the contact region and aligning the groove substantially in the same direction.

In the practical implementation of the method the tire, preferably an unused tire, is provided with an array of small holes, preferably circular in shape at the tire surface, to provide a hole at each axial position across the tread surface. The tire is then run on the vehicle under all driving conditions to initiate wearing of the tread over its entire width. The tread wear will become apparent with the appearance of a pattern of wear emanating in a particular direction from each small hole according to the axial position of the hole. Subsequently the tread groove pattern can be formed or cut into the tread of another tire by aligning the tread groove at any particular axial position in the same direction as the wear pattern emanating from the hole at that position on the worn tire.

Whilst the above-described embodiments have a substantially continuous tread surface between circumferentially adjacent tread grooves of the invention other embodiments may have other tread grooves or sipes as common in the art.

Also whilst the above-described embodiments have the groove angles or alignments at the inner edge IE and outer edge OE at 0° and 90° respectively to the tire circumferential direction other angles such as 10° and 80° respectively can be used which will retain to a large degree the advantage of reduced tread wear according to the invention.

What is claimed is:

1. A method of manufacturing a tire for a vehicle having a wheel at each corner, said tire having a tread surface including grooves, comprising (a) forming small holes in the tread surface of a first tire at successive axial positions across the tread of the first tire, (b) running the first tire on said vehicle to initiate a pattern of wear emanating from each small hole, and (c) forming tread grooves in the surface of a second tire such that at any particular axial point each tread groove of the second tire is oriented in the same direction as the pattern of wear emanating from the small hole formed at that point on the worn first tire.

2. A method according to claim 1, wherein the small holes are circular in shape at the tire surface.

3. A method according to claim 1 or 2 which further comprises (a) inspecting the holes formed in the first tire at successive axial points across the tread, and (b) orienting each tread groove substantially in the direction of the resultant force acting on the tread at that axial point when the point of the tire is in contact with the road so that the grooves of the second tire define a tread pattern giving optimum tread wear.

* * * * *